(12) United States Patent
van der Meulen et al.

(10) Patent No.: US 8,448,090 B2
(45) Date of Patent: May 21, 2013

(54) SELECTIVE PLUG-IN ACTIVATION FOR RESOURCE-LIMITED PLATFORMS

(75) Inventors: Pieter van der Meulen, Los Altos, CA (US); Ben Combee, Brooklyn, NY (US); Russell Brenner, Sunnyvale, CA (US); Jeff Finkelstein, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 639 days.

(21) Appl. No.: 12/690,106

(22) Filed: Jan. 19, 2010

(65) Prior Publication Data
US 2011/0022984 A1 Jan. 27, 2011

Related U.S. Application Data

(60) Provisional application No. 61/146,970, filed on Jan. 23, 2009.

(51) Int. Cl.
*G06F 9/46* (2006.01)
*G06F 3/048* (2006.01)

(52) U.S. Cl.
USPC ............................ 715/830; 715/764; 719/328

(58) Field of Classification Search
USPC .................................. 715/830, 764; 719/328
See application file for complete search history.

(56) References Cited

U.S. PATENT DOCUMENTS

| | | | | |
|---|---|---|---|---|
| 7,228,340 B2 * | 6/2007 | De Boor et al. | ............... | 709/217 |
| 7,461,353 B2 * | 12/2008 | Rohrabaugh et al. | ......... | 715/815 |
| 2005/0071745 A1 * | 3/2005 | Ehrich et al. | ............... | 715/500.1 |
| 2007/0044086 A1 * | 2/2007 | Sampath | ...................... | 717/168 |
| 2007/0186166 A1 * | 8/2007 | Anderson et al. | ............. | 715/730 |
| 2008/0235566 A1 * | 9/2008 | Carlson et al. | ................ | 715/205 |
| 2009/0326966 A1 * | 12/2009 | Callaghan et al. | ................ | 705/1 |

* cited by examiner

*Primary Examiner* — Tadeese Hailu
*Assistant Examiner* — Darrin Hope

(57) ABSTRACT

Presentation of advanced content items is selectively suspended and/or activated so as to manage system resources. In some embodiments, plug-in code is selectively activated based on prioritization schemes and responsive to resource usage, user input, and/or other conditions. For example, plug-in code can be selectively suspended when the advanced content being presented by the plug-in code is not in view (for example, if it has been scrolled off the screen); when the advanced content is brought into view, for example as a result of scrolling, the plug-in code is reactivated as appropriate and the presentation of the advanced content resumes. State information for suspended plug-ins can be stored so that upon reactivation, plug-in code resumes operation substantially where it left off.

27 Claims, 13 Drawing Sheets

SELECTIVE PLUG-IN ACTIVATION FOR RESOURCE-LIMITED PLATFORMS

CROSS-REFERENCE TO RELATED APPLICATIONS

The present application claims priority from U.S. Provisional Patent Application Ser. No. 61/146,970, filed Jan. 23, 2009, for "Selective Plug-In Activation for Resource-Limited Platforms", the disclosure of which is incorporated herein by reference.

FIELD OF THE INVENTION

In various embodiments, the present invention relates to the management of plug-ins for applications such as browsers, and more particularly to mechanisms for selectively activating plug-ins on a resource-limited platform.

DESCRIPTION OF THE RELATED ART

Many websites include dynamic or multimedia content such as animation, video, interactive elements, and the like. Such content, referred to herein as "advanced content", can be presented to users via a browser. Often the code for presenting the advanced content is not part of the built-in browser code itself, but is provided as an add-on which is referred to as a "plug-in". Users often install such plug-ins in order to be able to access advanced content that cannot be presented using the browser's built-in code.

An example of a plug-in is Adobe Shockwave, available from Adobe Corporation of San Jose, Calif. Advanced content that can be presented by Adobe Shockwave includes, for example, animations and interactive elements that are encoded using the Shockwave Flash (SWF) format. Many other plug-ins are available for presenting different types of advanced content.

When advanced content is rendered and presented, whether via a plug-in and/or by built-in code within a browser, significant demands are often made of the resources of the computing system. The advanced content is often authored with the processing power, memory capacity, and bandwidth of desktop PCs in mind. On some devices, such as mobile devices, processor power and memory may be more limited, making it difficult or impossible for several plug-ins or advanced content items to be presented at the same time.

Many users of mobile devices expect a rich Internet experience comparable to that presented on platforms that do not have such limitations. Accordingly, these users are disappointed when their web experience on a mobile device (or other device having resource limitations) fails to approximate a normal desktop-based experience. In particular, if several advanced content items are presented on a web page, the resource-limited device may be unable to launch all of the required plug-ins, or may run the content slowly, or may experience problems such as crashes, or may suffer from system responsiveness issues. Alternatively, the resource-limited device may fail to present the content at all, leaving the user with a blank screen or a partially rendered web page. Such results lead to user dissatisfaction, and can have even more serious consequences if the content relates to business-based or ecommerce applications.

Conventional systems fail to provide a technique for facilitating the presentation of plug-in-based content and other advanced content items on resource-limited platforms in a manner that satisfies user expectations. Conventional systems also fail to provide a mechanism for managing system resources on resource-limited platforms so that multiple plug-ins can be launched and advanced content items can be presented in a manner that approximates a desktop-based experience.

SUMMARY

In various embodiments, the system and method of the present invention provide a mechanism for selectively suspending and/or activating advanced content items so as to manage system resources. In some embodiments, plug-in code is selectively activated based on prioritization schemes and responsive to resource usage, user input, and/or other conditions. For example, plug-in code can be selectively suspended when the advanced content being presented by the plug-in code is not in view (for example, if it has been scrolled off the screen); when the advanced content is brought into view, for example as a result of scrolling, the plug-in code is reactivated as appropriate and the presentation of the advanced content resumes. State information for suspended plug-ins can be stored so that upon reactivation, plug-in code resumes operation substantially where it left off.

In various embodiments, the system and method of the present invention provide a mechanism for managing the use of system resources for loading and running plug-in code and other code for presenting advanced content items. Various configuration parameters can be established, to set maximum numbers of loaded plug-ins, running plug-ins, suspended plug-ins, and the like. Plug-ins that would cause a maximum to be exceeded can be suspended, terminated, or otherwise handled. Configuration parameters can also include prioritization among plug-ins, so as to ensure that appropriate choices are made when determining which plug-ins should be suspended or terminated. In various embodiments, such parameters can be set automatically, based on available system resources and/or other factors, and/or they can be modified by a user or system administrator. In this manner, the system and method of the present invention provide techniques whereby system performance can be optimized, and overloading of system resources can be avoided.

The various features described above and herein can be implemented singly or in any combination, as will be apparent to one skilled in the art. Additional features and advantages will become apparent from the description provided below.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

In the following description, the term "advanced content" is used to refer to any type of content that can be presented within a browser, whether such content is presented by a plug-in or by built-in code of the browser, such as an HTML 5 video tag. Presentation of advanced content may (but is not required to) involve the use of additional system resources, such as bandwidth, memory, storage space, and/or processing power, beyond what is normally used in the course of presenting ordinary HTML code. Examples of advanced content include animations, movies, interactive components, multimedia items, Flash content, and the like. This list is intended to be illustrative, not exhaustive, and one skilled in the art will recognize that the techniques described herein can be used for managing the presentation of many other types of content items in addition to those listed.

In the following description, the term "plug-in" is used to refer to a particular set of library code that gets loaded when a browser is attempting to display a particular type of advanced content. The term "plug-in" can also occasionally be used to refer to the content itself, or to a particular instance of the plug-in code; for example, for each appearance of a particular type of advanced content on a web page, the browser can create an instance, running the same plug-in code. Similarly, an HTML 5 video tag may create an instance of a video decoder. Different instances of a plug-in may have different settings and parameters, such as width and height; these are commonly referred to as instance variables.

The term "plug-in" is used herein for illustrative purposes. However, one skilled in the art will recognize that the techniques described herein can also apply to functionality that is part of the browser code itself, such as functionality for displaying animations, video, and multimedia content, whether or not such functionality implemented using a plug-in or using built-in code of the browser. In many cases, such built-in code can be dynamically loaded as needed. Any use of the term "plug-in" herein can be considered to apply to built-in browser code that is used for presentation of advanced content.

System Architecture

Figure 2:
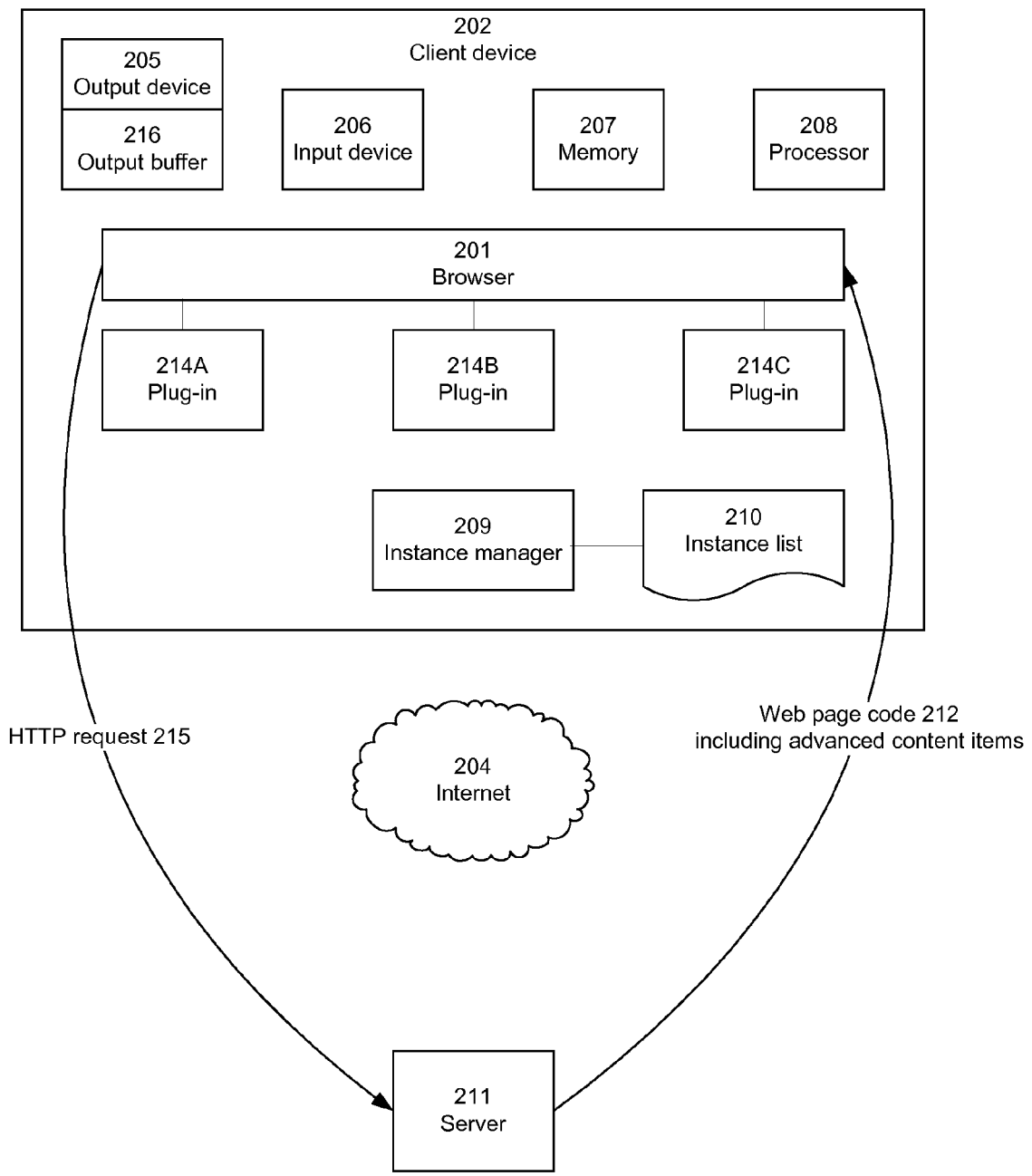
FIG. 2 is a block diagram depicting a functional architecture for implementing selective plug-in activation in an electronic device according to one embodiment of the present invention.

Referring now to FIG. 2, there is shown a block diagram depicting a functional architecture for implementing selective plug-in activation in an electronic device according to one embodiment of the present invention. Client device 202 is any electronic device having the ability to present content. Client device 202 may be a personal computer, handheld computer, personal digital assistant, smartphone, cell phone, kiosk, or any other device capable of delivering and presenting content. The content presented by device 202 can be obtained from one or more remotely located servers 211 via the Internet 204. In one embodiment, transmission of content and other data between server 211 and client device 202 is implemented using well-known communication protocols such as Hypertext Transfer Protocol (HTTP) and Transmission Control Protocol/Internet Protocol (TCP/IP).

One skilled in the art will recognize that the techniques presented herein can be applied to content that is obtained by device 202 from sources other than the Internet 204, such as content from a file that is locally stored at client device 202, or content from a fixed or removable medium such as a CD, DVD, Blu-Ray disc, or the like, or content that is obtained or delivered via any type of wired or wireless network connection.

In various embodiments, client device 202 includes hardware components such as an output device 205 (which may include a screen, speakers, and/or any other components for presenting content to a user), input device 206, memory 207, and processor 208. Output buffer 216, also referred to as a frame buffer, is used for temporary storage of image data to be displayed on output device 205, according to well known techniques.

Such components are well known in the art, and can be of any form as will be apparent to one skilled in the art. Device 202 can include any number of such components; for example, two or more input devices 206 can be provided such as a touch-screen, physical or virtual keyboard, microphone, or any combination thereof. In addition, some hardware components can function as two or more functional components; for example, a touch screen may function as both output device 205 and input device 206.

In various embodiments, client device 202 can run software, such as an operating system (such as, for example, webOS available from Palm, Inc. of Sunnyvale, Calif., or Microsoft Windows 7 available from Microsoft Corporation of Redmond, Wash.) and any number of applications. Software runs on processor 208 according to well known techniques.

In one embodiment, browser software 201 runs on client device 202; browser 201 is software designed to receive user requests for web-based content and to present such content to the user. Examples of browsers 201 include Microsoft Internet Explorer available from Microsoft Corporation of Redmond, Wash. and Mozilla Firefox available from Mozilla Corporation of Mountain View, Calif.

Web-based content presented by browser 201 may include web pages, which may in turn include advanced content items such as animations, video, interactive elements, and the like. Browser 201 may present such advanced content using built-in code, and/or by using one or more plug-ins 214. In the example of FIG. 2, three plug-ins 214A, 214B, 214C are depicted; however, any number of plug-ins 214 can be installed for a particular browser 201. Each plug-in 214 is implemented as an external program or library that can be dynamically loaded and instantiated in order to present particular types of advanced content. As will be described in more detail below, instance manager 209 is a software component that manages the loading, instantiation, suspension, and termination of plug-ins 214 according to the techniques of the present invention. Instance manager 209 maintains instance list 210 to keep track of instances of plug-ins 214.

As is well known in the art, a user requests web-based content, for example by typing a uniform resource locator (URL) into an input field of browser 201, or by clicking on a link or selecting from a list of favorites. Browser 201 transmits HTTP request 215 to server 211; request 215 may be transmitted to server 211 via the Internet 204 using well-known protocols. Server 211 responds by transmitting web page code 212 (such as HTML code) back to device 202 for display by browser 201. Web page code 212 may also include advanced content items such as scripts or other items to be run using plug-in 214. Browser 201 uses web page code 212, including advanced content items, to cause a web page be presented via output device 205 according to techniques described in more detail below. The web page, including the advanced content items, may include audio as well as visual elements.

Further details as to the operation of browser 201, plug-ins 214, instance manager 209, and instance list 210 are provided below.

Web Page Example

Figure 1A:
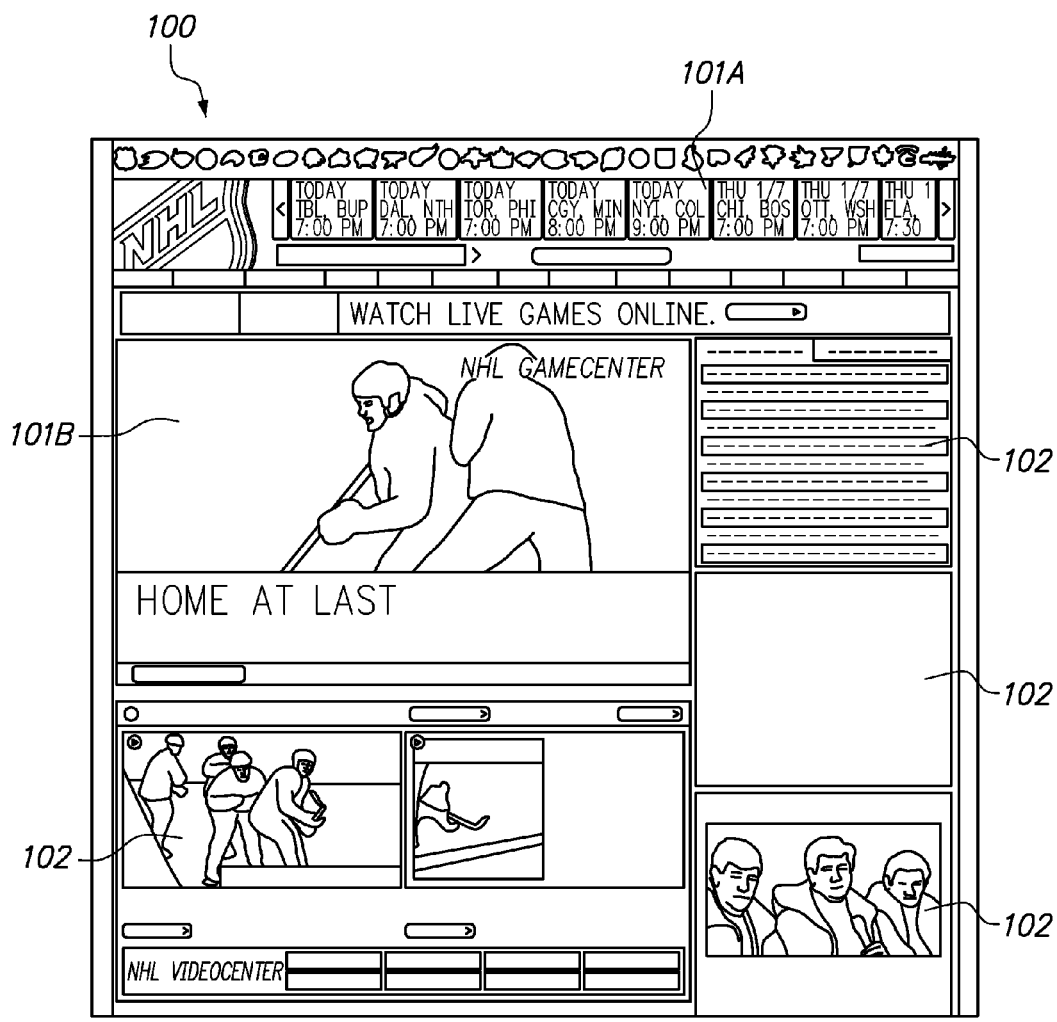
FIG. 1A depicts an example of a web page including advanced content items.

Referring now to FIG. 1A, there is shown an example of a web page 100 including advanced content items 101. As is well known in the art, web pages 100 can be viewed on a browser running on a personal computer or other electronic device. Web page 100 contains a number of different components, including static elements 102 (images, text, graphics, and the like) as well as advanced content items 101. In the example shown in FIG. 1A, advanced content items 101 include an interactive scoreboard display 101A and an interactive video display window 101B. Both of the advanced content items 101A, 101B in this particular example use the Shockwave Flash (SWF) format and are presented using the Adobe Shockwave plug-in.

Figure 1B:
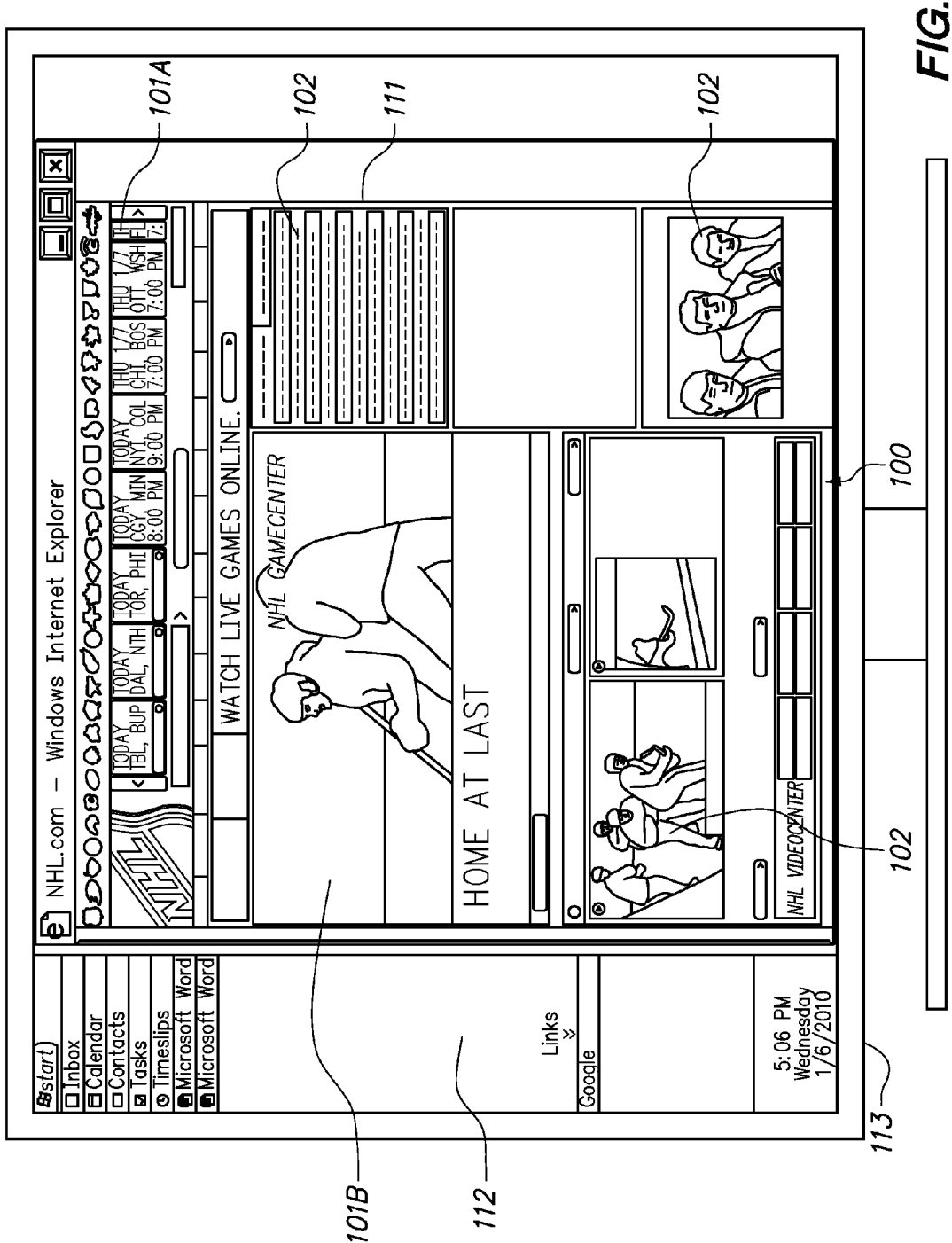
FIG. 1B depicts an example of a display of a web page including advanced content items on a desktop computer screen.

Referring now to FIG. 1B, there is shown an example of a display of web page 100 as it might be presented on a desktop computer screen 113. Web page 100 is displayed within a resizable window 111 of a graphical user interface according to well known techniques. In the example, the computer is running the Microsoft Windows XP operating system, available from Microsoft Corporation of Redmond, Wash. Other elements are visible outside resizable window 111, including portions of other windows and task bar 112. For illustrative purposes, it is assumed that the computer has sufficient resources to present all of the advanced content items 101 of web page 100; accordingly, the presentation of web page 100 includes all of these advanced content items 101.

Figure 1C:
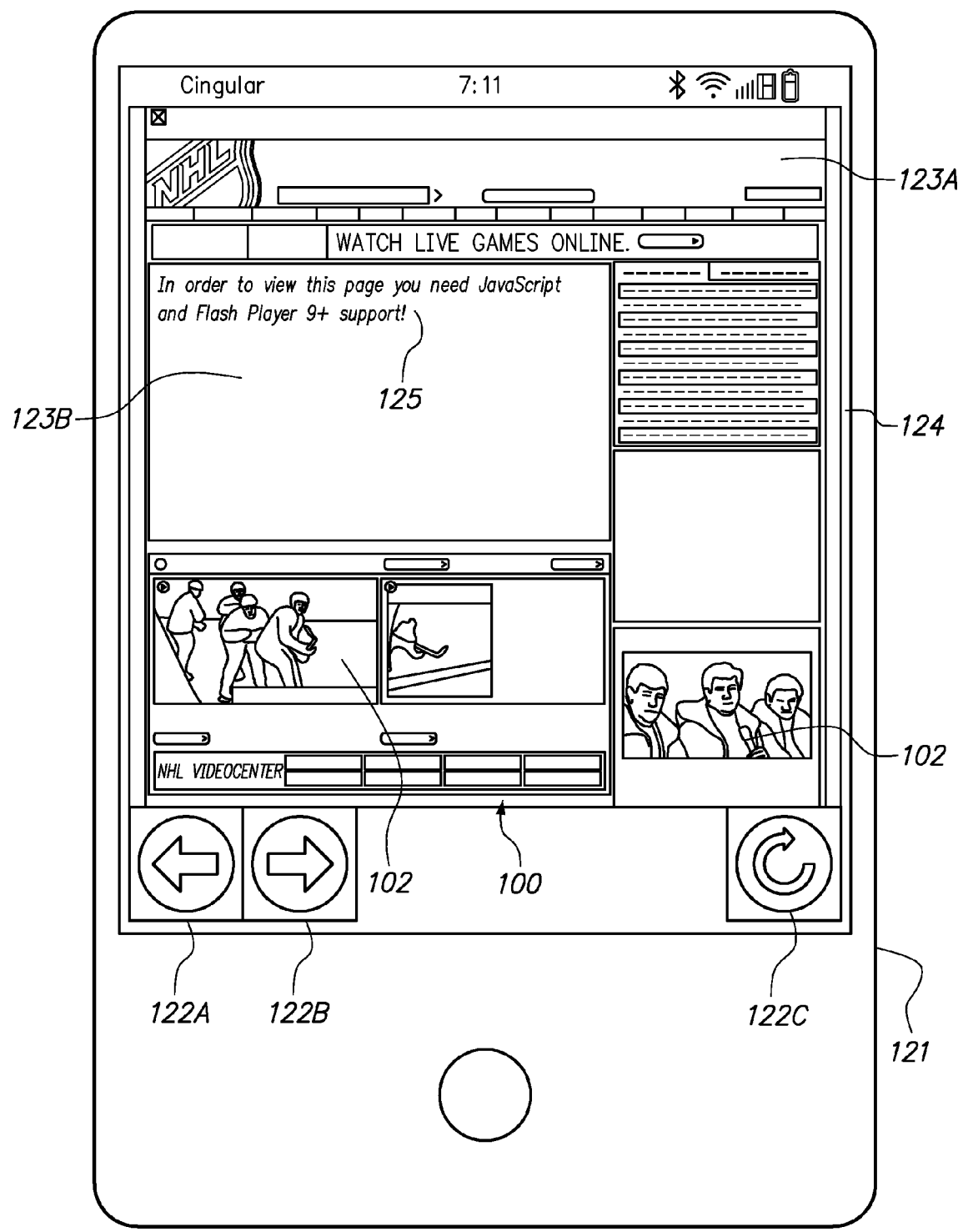
FIG. 1C depicts an example of a display of a web page omitting advanced content items.

Referring now to FIG. 1C, there is shown an example of a display of web page 100 as it might be presented when advanced content items cannot be displayed. In the example, web page 100 is depicted on a screen 124 of a device 121 having limited resources. Device 121 may be, for example, a smartphone or other mobile computing device. Device 121 is running a browser 201 that presents web page 100 and also provides buttons 122A, 122B, 122C for navigating and reloading web page 100. Static elements 102 are displayed, but advanced content items 213 are omitted. Areas 123A, 123B where advanced content items 213 would otherwise be presented are blank, or have a message 125 informing the user that additional resources are required in order to view the content items 213.

In the example of FIG. 1C, the display of web page 100 is shown at substantially the same size as in FIG. 1B. However, one skilled in the art will recognize that mobile computing devices 121 often have smaller screens 124 than desktop computers, so that only a portion of web page 100 may be shown. A user can scroll to see other portions of web page 100 according to well known techniques.

The present invention provides several techniques for ensuring that system resources are allocated in an optimal manner so as to provide as enriched a web experience as possible, and avoid unwanted omission of advanced content.

Display of Web Page Including Advanced Content Items

As is known in the art, in one embodiment, browser 201 renders web page 100 for display by cycling through a list of objects on web page 100. This cycling process allows dynamic elements to be displayed properly alongside static elements.

Static content items 102 such as text or still images may be rendered once for the display of web page 100; the result is sent to output buffer 216 for display on output device 205.

Dynamic content items, such as an animated graphics interchange format (GIF) image, may include multiple frames. Accordingly, each time the object is given an opportunity to render content, a different image may (potentially) be presented and sent to output buffer 216 for display on output device 205. In one embodiment, browser 201 periodically checks for new data from the dynamic content item, so as to present the content to the user as an animation or movie.

As discussed above, advanced content items 101, such as plug-in content items 101 depicted in the example of FIG. 1A, can be handled by one or more plug-ins 202. Each plug-in 202 executes code for advanced content item(s) 101 and provides the results to output buffer 216 for display on output device 205 along with the remaining portions of web page 100.

For example, a web page containing Shockwave/Flash content might include web page code 212 in HTML format as follows:

```
<HTML><HEAD><TITLE>Embedded:
2.swf</TITLE></HEAD>
    <BODY>
    <H2>Embedded swf: 2.swf</H2>
    <IMG SRC="animation.gif">
    <OBJECT CLASSID="clsid:D27CDB6E-AE6D-11cf-
96B8-444553540000"
        WIDTH=640 HEIGHT=480
        CODE-
BASE="http://active.macromedia.com/flash5/cabs/sw
flash.cab#version=5,0,0,0">
        <PARAM NAME="MOVIE" VALUE="2.swf">
        <PARAM NAME="PLAY" VALUE="true">
        <PARAM NAME="QUALITY" VALUE="best">
        <PARAM NAME="LOOP" VALUE="true">
        <EMBED SRC="2.swf" WIDTH=640 HEIGHT=480
            PLAY="true" LOOP="true" QUALI-
TY="best" PLUGINS-
PAGE="http://www.macromedia.com/shockwave/downloa
d/index.cgi?P1_Prod_Version=ShockwaveFlash">
        </EMBED>
    </OBJECT>
    </BODY>
</HTML>
```

In this HTML code, the <IMG SRC="animation.gif"> (an animated image) is handled by built-in code of browser 201. For the <OBJECT . . . >, browser 201 identifies a plug-in 214 to display the object, and loads the appropriate plug-in 214 library (in this case a Shockwave/Flash library). After loading the library, browser 201 instructs the library to start loading the code for the advanced content item (here located in file "2.swf"). Browser 201 then relies on plug-in 214 to fill the area of 640 by 480 pixels.

In order to provide a reasonable animation experience when rendering the "animation.gif" animated image, browser 201 updates the rendered page 100 periodically, for example at 10 times a second. For the Flash content item, browser 201 relies on plug-in 214 to tell it if the content of its 640 by 480 area has changed.

In one embodiment, a timer loop can be set up to periodically call the main plug-in 214 routine that causes the code to execute (the "do something" routine), for example at a rate of 10 times per second. However, the actual changes to the displayed output of the plug-in 214 may take place at less frequent intervals. For example, plug-in 214 may not do anything for the first two or three cycles to change its displayed output. Then, after these two or three cycles, plug-in 214 may determine that it has visual results to present, requiring an update to the displayed output. To trigger an update on output device 205, plug-in 214 sends a message, such as an "invalidate rectangle" message, to browser 201. This message makes browser 201 aware of the so-called "dirty rectangle"; as a result, browser 201 issues a call to plug-in 214 once it is ready to display the updated content. Plug-in 214 renders its output in the designated area of the displayed web page 100.

In various embodiments, any of several standard handshaking and exchange API (Application Program Interfaces) can be defined and/or implemented in order to facilitate communication between browser 201 and plug-ins 214, and to instantiate, initiate, call, and terminate plug-ins 214 as needed. For example, in one embodiment, NPAPI (Netscape Plug-in API) is used, which defines several routines to be used for plug-in 214 management and communication:

NPP_New: creates a new plug-in instance;
NPP_Destroy: destroys a plug-in instance when it is no longer needed;
NPP_HandleEvent: sends a "Draw event" message to plug-in 214, informing plug-in 214 that it may proceed with updating its area of page 100;
NPN_InvalidateRectangle: used by plug-in 214 to update visual results, for example to inform browser 201 of changes that have occurred in a particular area of page 100.

As shown in the example of FIG. 1A, web page 100 may include any number of advanced content items 101. Some client devices 202, such as desktop computers, generally have sufficient processor and memory resources to permit all plug-ins 214 to set up a timer loop while still maintaining satisfactory performance levels and providing smooth animation and operation. On some computing devices 202, however, such as mobile devices, processor and/or memory resources may be limited. Accordingly, various embodiments of the present invention provide plug-in 214 instance management and control so as to avoid overloading, crashes, and system performance issues that might otherwise result from an attempt to run too many plug-ins 214 simultaneously.

Selective Plug-In Activation and Management

In various embodiments, the system and method of the present invention provides several mechanisms for managing plug-in activation so as to avoid overloading system resources. Plug-in management can be used, in various embodiments, to limit the number of plug-ins 214 that are loaded in memory 207 at any given time, and/or to limit the number of plug-ins 214 that are active (running) at any given time.

In one embodiment, selective plug-in loading and activation is managed by instance manager 209, which is a software component running on device 202. Each time browser 201 issues a call (such as NPP_New) to generate an instance of a particular plug-in 214, instance manager 209 handles the request by creating a new object representing the instance, and by assigning appropriate parameters to the instance. These parameters may include, for example, the URL to the content (swf), the area (width, height) and other relevant parameters.

In one embodiment, instance manager 209 maintains instance list 210, which may be implemented as a linked list or other data construct, and may be represented as a global or class variable depending on the nature of the programming language. Instance list 210 can be stored in memory 207 and/or in persistent storage such as a hard drive. Instance list 210 keeps track of which plug-ins 214 are currently loaded, how many instances of each plug-in 214 are currently running, and the like.

Figure 3A:
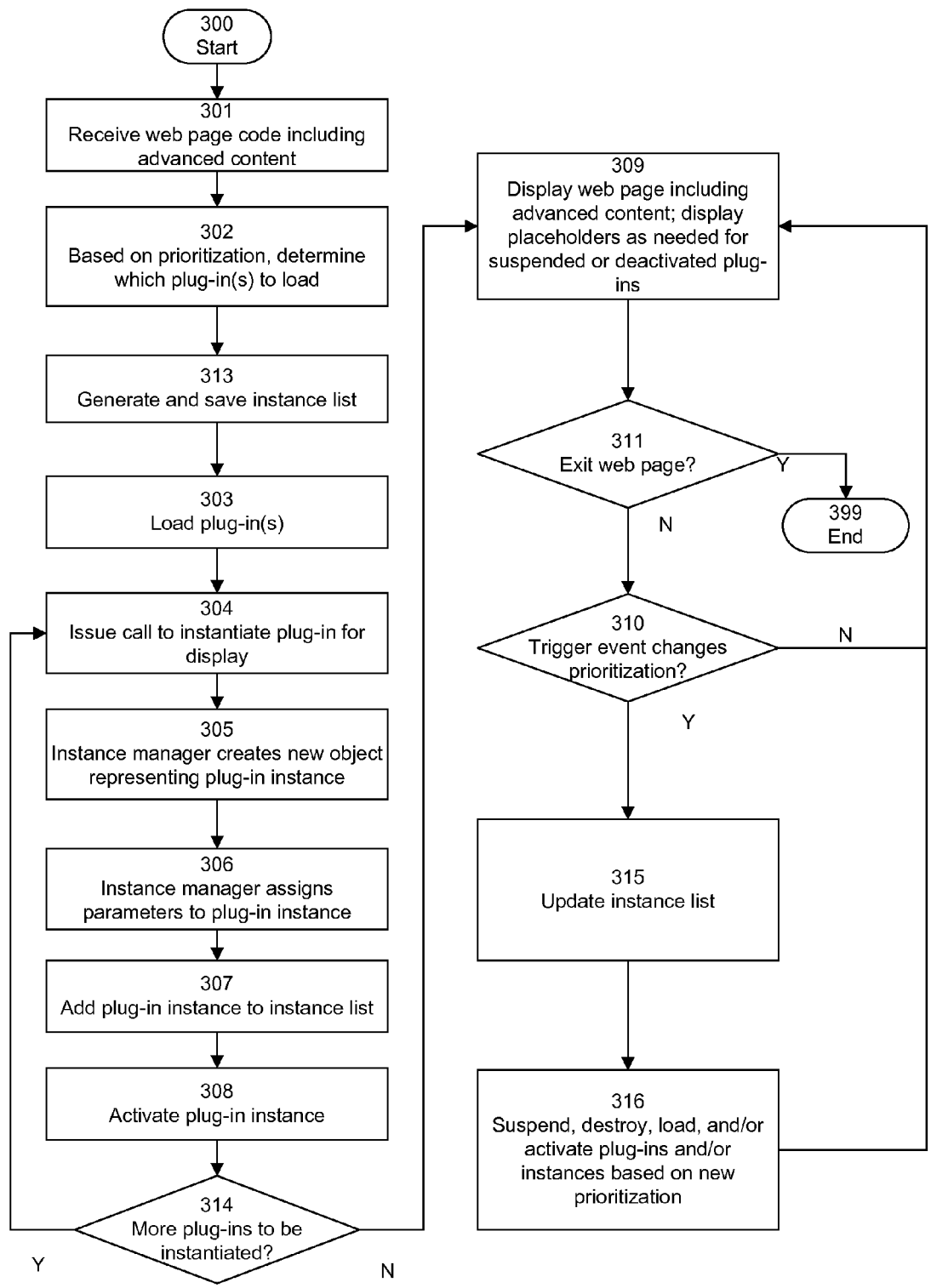
FIG. 3A is a flowchart depicting a method for implementing selective plug-in activation in an electronic device according to one embodiment of the present invention.

Referring now to FIG. 3A, there is shown a flowchart depicting a method for implementing selective plug-in activation in an electronic device according to one embodiment of the present invention.

Browser 201 receives 301 web page code 212 including advanced content item(s) 101. Such web page code 212 may be, for example, HTML code containing Shockwave/Flash content as described above. Instance manager 209 determines 302, based on a prioritization scheme, which plug-in(s) 214 to load in order to render advanced content 101. In situations where system resources are sufficient to permit all received advanced content 101 to run, instance manager 209 may determine that all plug-ins 214 needed to render the received advanced content 101 can be loaded. In situations where system resources are insufficient to permit all advanced content 101 to run, a prioritization scheme dictates which plug-ins 214 should be loaded.

The system of the present invention can use the prioritization scheme in any situation, particularly if some type of system resource is insufficient to permit all advanced content 101 to run. In this manner, the system of the present invention is able to prioritize consumption of various types of system resources, including for example:

memory 207;
processor bandwidth;
bandwidth of some other system component such as digital signal processor (DSP);
network bandwidth;
screen space, such as on output device 205.

For example, if memory 207, processor bandwidth, or network bandwidth is constrained, the system of the present invention may use the prioritization scheme to decide which plug-ins to load and/or destroy, and which instances to instantiate and activate and/or suspend, as described in more detail below. If DSP bandwidth is constrained, the system of the present invention may use the prioritization scheme to selectively destroy and/or suspend plug-ins that consume high amounts of DSP bandwidth. If screen space is constrained, the system of the present invention can suspend instances if the available area on output device 205 is too small to effectively display output from the plug-in.

The prioritization scheme may be based on any number of factors, including for example:

relative importance of each advanced content item 101: an author of a web page may specify that certain advanced content items 101 be given priority over others;
position on screen: advanced content items 101 that are currently visible on output device 205 may be given priority over those that have been scrolled off-screen;
proximity to currently active advanced content items 101: advanced content items 101 that are closer to active, currently displayed advanced content may be given higher priority than advanced content items 101 that are farther away;

user input: a user may indicate that a particular advanced content item 101 should be activated by clicking on the on-screen area associated with the advanced content item 101;

number of instances for each plug-in 214: for some web pages, multiple advanced content items 101 may be associated with a single plug-in 214; it may therefore be preferable to set priorities so as to load those plug-ins 214 that will be used for multiple instances.

In some situations, trigger events may cause the prioritization scheme to change. For example, if an advanced content item 101 that was previously off-screen (and not loaded) is scrolled on-screen, its priority level may increase; therefore, instance manager 209 may cause it to be loaded. Conversely, instance manager 209 may cause an advanced content item 101 that was previously on-screen to be suspended and/or destroyed when it is scrolled off-screen. Because of the overhead associated with loading an advanced content item 101, it may be preferable, in some embodiments, to suspend (but not destroy) advanced content items 101 that are moved off-screen, if it is likely that they will later be brought back on the screen.

Instance manager 209 generates 313 and saves instance list 210 to identify and locate instances. In one embodiment, each instance keeps track of its current state, which may be loaded, created, suspended, active or zombie, as described below in connection with FIG. 5. Instance manager 209 controls the state of each instance based on various factors as described herein, and further determines how many instances of each plug-in 214 are needed. The specified plug-ins 214 are loaded 303 into memory.

A loop is then performed, to instantiate plug-ins 214 as needed in order to display advanced content items 101. In one embodiment, the system only instantiates those plug-ins 214 that are needed to run the selected advanced content items 101 based on the prioritization. For each plug-in 214 instance needed, the following steps are performed: First, browser 201 issues 304 a call to instantiate plug-in 214. Instance manager 209 creates 305 a new object representing the instance of plug-in 214. Instance manager 209 assigns 306 parameters for the instance; such parameters may include, for example, dimensions of the content to be rendered, frequency with which the content should be updated, prioritization and/or trigger events for suspension or destruction, and the like.

Instance manager 209 adds 307 the plug-in 214 instance to instance list 210, and the instance is activated 308. Activation 308 takes place by starting an execution loop for the plug-in 214 instance. When appropriate, the instance itself may lower its priority of frequency of being called. For example, once it has completed a preload, which may include, for example, the fetching of content based on the URL, the instance may suspend its operation or lower its priority, particularly if it does not have any new output to present.

Instance manager 209 determines 314 whether any more plug-ins 214 are to be instantiated. If so, the method returns to step 304. Otherwise it continues to step 309.

Browser 201 displays 309 web page 100 including advanced content items 101 rendered by those plug-ins 214 that are loaded and active. Areas of web page 100 that are designated for advanced content 101 can be occupied by placeholders if plug-ins 214 for those areas are not active. Such placeholders can take any form; for example, they may be given a distinctive visual appearance, such as a particular color, icon, border, message, or the like, to inform the user that a plug-in 214 for that area of web page 100 is not currently running. For example, placeholders can be indicated by a green border around the area that would otherwise be occupied by the advanced content 101 if it were being rendered.

If the user closes browser 201 or exits 311 web page 100 (for example, by moving to another web page), the method ends 399. If a trigger event occurs 310 that changes the prioritization, instance list 210 is updated 315 accordingly, and plug-ins 214 and/or instances are suspended, destroyed, loaded, and/or activated 316 according to the new prioritization. Such trigger events can be, for example, a change in focus (i.e., the user clicking on a currently suspended plug-in in order to activate it), scrolling, and the like. In one embodiment, if the user selects a plug-in for activation, for example by clicking on a displayed plug-in area, the selected plug-in is assigned a higher priority than a previously automatically selected plug-in. In one embodiment, such a manually selected plug-in will remain active, independent of scrolling, until the content area associated with the plug-in moves completely out of view.

In one embodiment, if a plug-in is playing audio, such as an Internet-based radio station, the plug-in remains active even when scrolled out of view. Explicit selection of another plug-in by the user can suspend such a plug-in.

In one embodiment, each plug-in is aware of its state, as well as the state of other plug-ins, so that a negotiation process can be used to give the user the most sensible user experience, while efficiently managing computing resources.

Figure 3B:
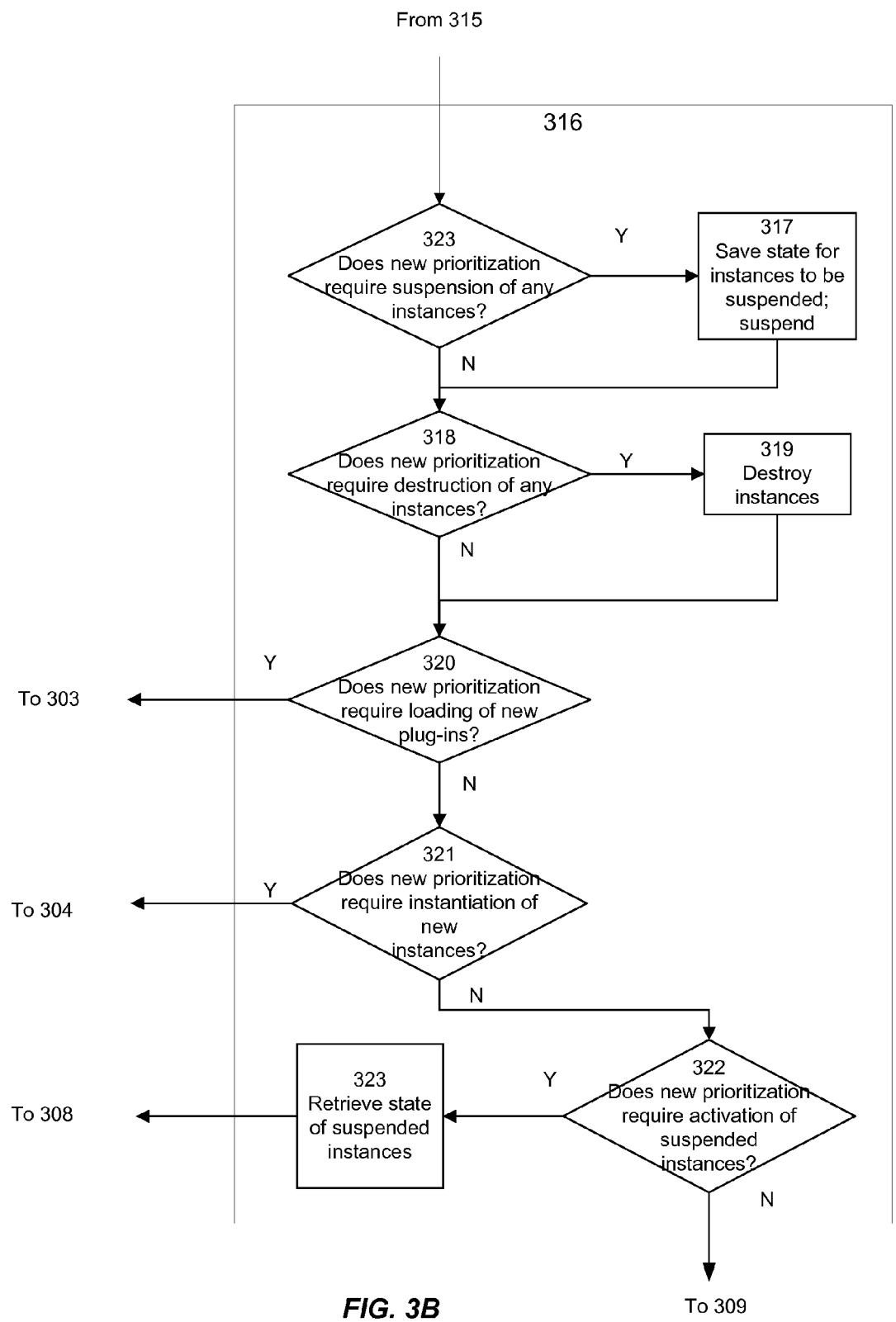
FIG. 3B is a flowchart depicting a method for suspending, destroying, loading, and/or activating plug-ins and/or instances according to one embodiment of the present invention.

Referring now to FIG. 3B, there is shown a flowchart depicting details of step 316, including a method for suspending, destroying, loading, and/or activating plug-ins and/or instances according to one embodiment of the present invention.

If, in step 323, the new prioritization requires suspension of any instances (for example to conserve processor resources being used by active instances), state is saved 317 and the instances are suspended. In one embodiment, suspension of an instance entails maintaining a full area copy of the instance's state at the time it was suspended. A static visual representation of this full area copy, which may be referred to as a "placeholder", can be displayed in the area formerly occupied by the advanced content item. The instance's periodic loop goes to a low refresh rate, or can even become dormant with no refresh; however, the saved state means that the instance is ready to resume at any time. On-screen display of advanced content item 101 can be replaced, in one embodiment, by a static image representing the most recent state of advanced content item 101 before it went into suspension. In one embodiment, an icon or distinctive visual indicator can be provided (such as a "play" icon and/or colored border), to indicate that advanced content item 101 is in a suspended state. In one embodiment, the user can activate advanced content item 101 by clicking on it, bringing it into focus, or performing some other command.

If, in step 318, the new prioritization requires destruction of any instances (for example to conserve processor resources and/or reduce memory usage), the instances are destroyed 319. Destruction of an instance means that all variables are cleared and released. No state is saved.

If, in step 320, the new prioritization requires loading of any plug-ins 214, (for example, if the plug-in was not previously loaded and is now needed for rendering of advanced content item(s) 101) the method returns to step 303 to load plug-ins 214 as needed.

If, in step 321, the new prioritization requires instantiation of any plug-ins 214, the method returns to step 304 to instantiate plug-ins 214 as needed.

If, in step 322, the new prioritization requires activation of any previously suspended instances, the previous state of the suspended instances is retrieved 323 and the method returns to step 308 to activate the suspended instance.

Changes of prioritization can take place in response to any trigger event. For example, in some embodiments, a change in prioritization can take place in response to scrolling that causes one (or more) area of web page 100 occupied by advanced content to move onto or off the screen. In some embodiments, the user can specify that he or she wishes a particular advanced content item 101 to become active; for example, the user may click on a placeholder to change prioritization and cause the plug-in 214 for that area of web page 100 to be loaded (if it is not already loaded), instantiated and activated. This change in prioritization may cause other plug-ins 214 to be suspended and/or destroyed, depending on available system resources. In one embodiment, a user can be prompted to confirm his or her choice of activating a plug-in 214, and may be informed that other plug-ins 214 may be suspended and/or destroyed as a consequence of this choice.

In one embodiment, each plug-in instance has a reference to instance list 210 to which it belongs, so that it can enumerate the list 210 and thereby communicate with other instances in the list. In one embodiment, instances can, for example, send messages to cause other instances to use fewer resources, such as by slowing down. In one embodiment, an instance can use list 210 to identify other instances that are farther away and send messages to cause those instances to use fewer resources, such as by slowing down. Such a process can be iterative, so that if insufficient resources are freed up from those instances slowing down, the messages can be sent to more instances until the appropriate amount of resources are freed up. By performing such a process iteratively, the system of the present invention respects prioritization that may recognize that advanced content that is closer to active, currently displayed advanced content should be given higher priority than advanced content that is farther away.

In addition, as discussed above, instance manager 209 maintains list 210 and can therefore send a message to all plug-in instances when in list 210 when appropriate.

Some web authors use hidden instances on web pages 100, for example to perform various functions that may not have immediate visual effects. Such hidden plug-ins generally have no designated advanced content area associated with the instance. In one embodiment, the system of the present invention avoids suspending such instances. Where possible (depending on the implementation and system support), in one embodiment, hidden plug-ins are run at lower priority or using a slower update rate so as to conserve resources when running such plug-ins in a resource-challenged environment such as a mobile device.

Viewable Area

In one embodiment, the system of the present invention loads, instantiates, and activates code for advanced content items 101 when they are in a viewable area of web page 100, subject to resource limitations and defined prioritization schemes. Thus, if only a portion of web page 100 is currently viewable, code for advanced content items 101 that are not viewable need not be loaded, instantiated, or activated (though they may be loaded and not instantiated, or loaded, instantiated and suspended, in order to improve performance if they are later made viewable). If a viewable area of web page 100 containing advanced content 101 becomes non-viewable, instance(s) for advanced content item(s) 101 in that area can be suspended and/or destroyed, depending on the amount of system resources available. If a non-viewable area of web page 100 containing advanced content 101 becomes viewable, advanced content item(s) 101 in that area are loaded, instantiated, and/or activated as appropriate, subject to resource limitations and defined prioritization schemes.

Figure 7:
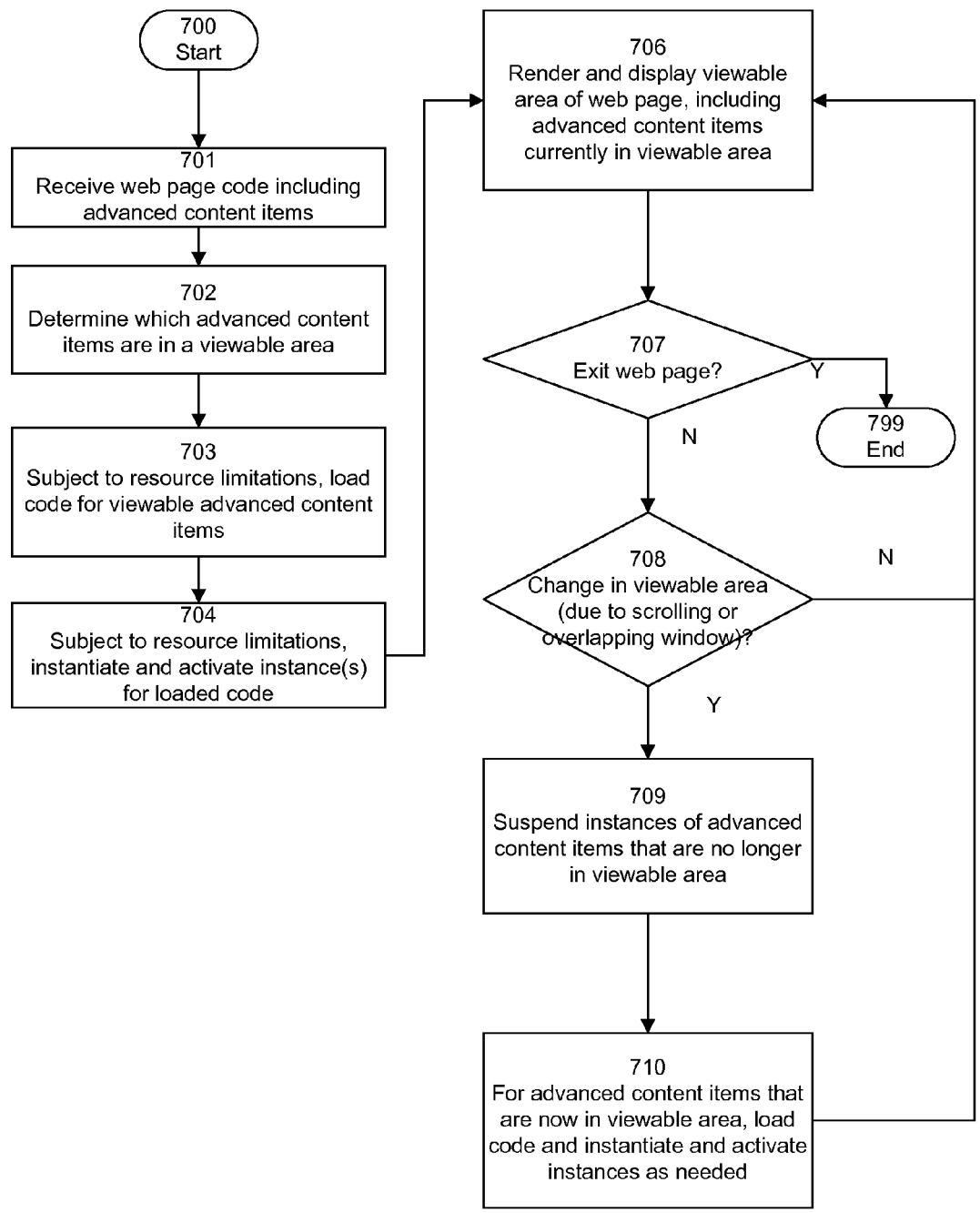
FIG. 7 is a flowchart depicting a method of selective activation of advanced content items in response to changes in viewable area, according to one embodiment.

Referring now to FIG. 7, there is shown flowchart depicting a method of selective activation of advanced content items 101 in response to changes in viewable area, according to one embodiment. Browser 701 receives 601 web page code 212 including advanced content item(s) 101. The system determines 702 which of the advanced content item(s) 101 are within a viewable area. For example, if an on-screen browser window only shows a portion of the web page 100, then that portion is considered viewable. If other windows or on-screen objects may overlap, hide, or obscure portions of the web page 100, then those portions are considered non-viewable.

Subject to resource limitations, defined prioritization schemes, and potentially other factors, the system loads 703 code for advanced content item(s) 101 that are within (or partially within) the viewable area. In one embodiment, if resource limitations dictate that code for only a subset of viewable advanced content items 101 can be loaded, then a prioritization scheme is used to determine which code to load. For example, in one embodiment, as described herein, an advanced content item 101 that has focus or is deemed more important than others may be given priority for loading.

Subject to resource limitations, the system instantiates and activates 704 instance(s) for the loaded code for advanced content item(s) 101 that are within (or partially within) the viewable area. Again, in one embodiment, if resource limitations dictate that only a subset of instances of code for viewable advanced content items 101 can be instantiated and activated, then a prioritization scheme is used to determine which instance(s) to instantiate and activate. Browser 701 renders and displays 706 the viewable area of web page 100, including advanced content item(s) 101 currently in the viewable area.

If the user exits 707 web page 100, the method ends 799.

Otherwise, the system determines 708 whether a change in the viewable area of web page 100 has taken place. Such a change may take place, for example, when a user causes a browser window to scroll so that it displays a different portion of web page 100. Such a change may also take place, for example, if another window overlaps the browser window, obscuring some or all of the web page 100, or if a previously obscuring window moves, changes size, or is dismissed. In any of these cases, the system makes appropriate adjustments to the execution of code for advanced content item(s) 101, by loading, instantiating, activating, suspending, and/or destroying code and/or instance(s) as appropriate.

Specifically, in one embodiment, the system suspends 709 instance(s) of advanced content item(s) 101 that are no longer in the viewable area. For advanced content item(s) 101 that were not in the viewable area but have now become viewable, the system loads the code (if it was not previously loaded), instantiates instance(s) as needed, and activates instance(s) as needed. If instance(s) were previously suspended, their previous state may be restored when they are reactivated. Such operations are performed subject to resource limitations. Thus, in one embodiment, if resource limitations dictate that only a subset of instances of code for viewable advanced content items 101 can be instantiated and activated, then a prioritization scheme is used to determine which instance(s) to instantiate and activate.

The system then returns to step 706.

Preloading

Figure 6:
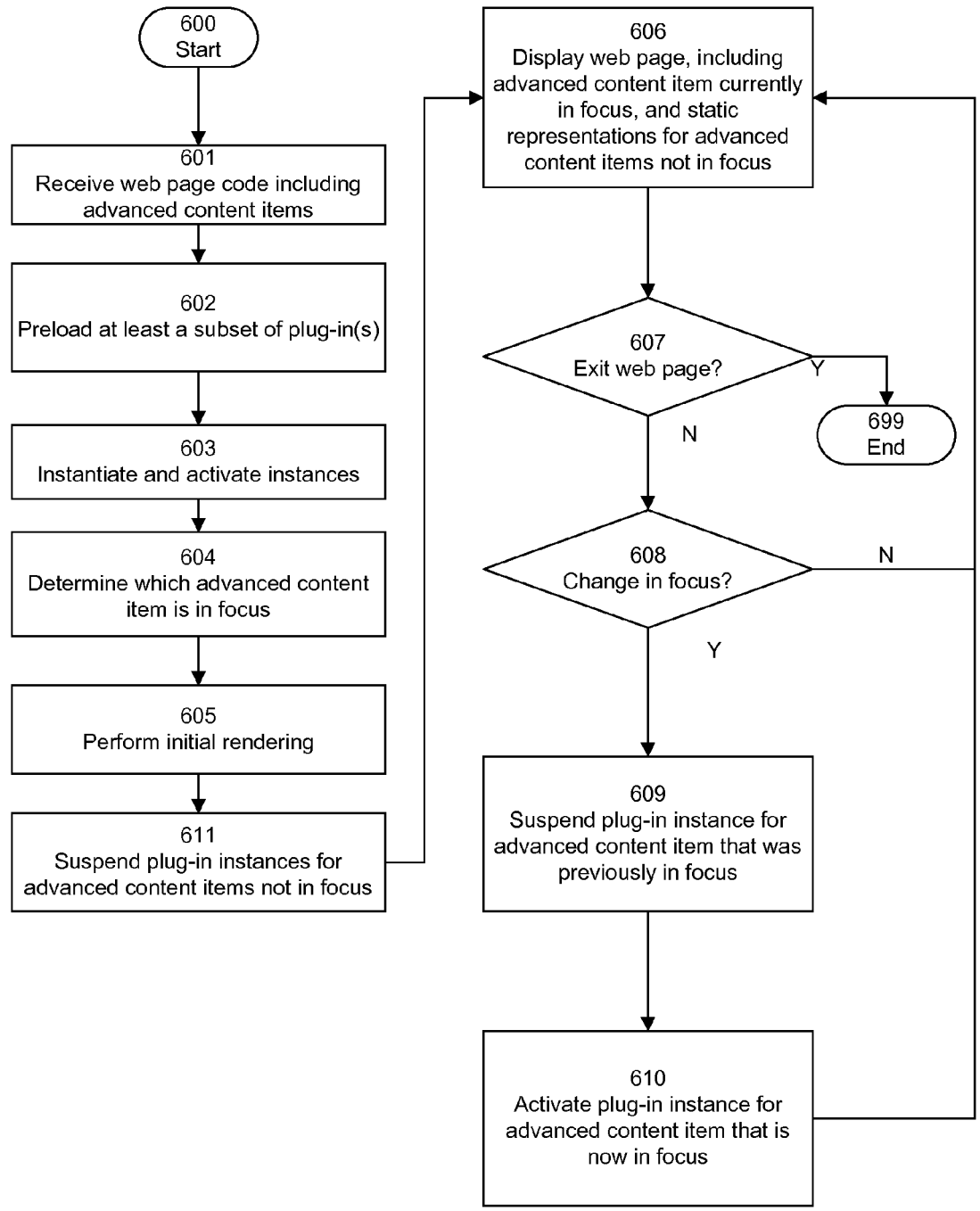
FIG. 6 is a flowchart depicting a method of preloading and pre-rendering advanced content items according to one embodiment.

Referring now to FIG. 6, there is shown a flowchart depicting one example of a method of implementing selective plug-in activation according to one embodiment, wherein advanced content items are preloaded and pre-rendered to improve web page 100 presentation while conserving system resources. According to the method shown in this example, plug-ins 214 that are not currently in focus are suspended, to be activated if and when they are brought into focus. Preloading and initial rendering is performed prior to suspension of plug-in(s) 214 not in focus. Plug-in(s) 214 whose instances are designated to go into a suspended state perform such preload and initial rendering with a full area update once or a pre-set number of times before going to a suspended state. In this manner, the system of the present invention can, in some embodiments, avoid displaying web pages 100 with blank areas. Rather, those areas that are not being rendered by active instances can at least be occupied by static images representative of the advanced content items 101 that would otherwise be displayed. This may be preferable to a blank area or static message informing the user that plug-in 214 is currently suspended. For some advanced content items 101 (such as movies), the first frame or full area update may not be adequately representative of the content due to fade-in or other animation effects; accordingly, in such cases, plug-in 214 may wait until after some number of frames or full area updates (such as 2 to 5) before going to a suspended state.

According to the method of FIG. 6, browser 201 receives 601 web page code 212 including advanced content item(s) 101. At least a subset of plug-ins 214 are preloaded. For example, in one embodiment, plug-in(s) 214 needed to perform initial rendering of currently visible advanced content item(s) 101 are preloaded 602, while plug-in(s) 214 corresponding to advanced content item(s) 101 that are off-screen need not be preloaded. In another embodiment, if resources permit, all plug-in(s) 214 needed to perform initial rendering of advanced content item(s) 101 on the web page are preloaded 602, regardless of whether they are currently on-screen or off-screen. Preloading of all plug-in(s) 214 may improve responsiveness by avoiding the need to load additional plug-in(s) 214 in response to user scrolling to different areas of web page 100.

In one embodiment, in order to conserve system resources, after initial rendering, some instance(s) automatically go into a suspended mode except for the one that is in focus at any given time. The instance having focus may be selected explicitly (for example, in response to user clicking on the corresponding area of the screen), or can be selected automatically based on location (center or top of screen), area occupied, use of audio, and current CPU/memory usage.

Plug-in(s) 214 are instantiated and activated 603. The system then determines 604 which advanced content item 101 is initially in focus. Initial rendering is performed 605, including plug-in(s) 214 not initially in focus. Plug-in(s) 214 whose instance(s) are not initially in focus are suspended 611 after initial rendering 605, but first they perform preload 602 and initial rendering 605 with a full area update once or a pre-set number of times. In one embodiment, preloading 602 and initial rendering 605 (also referred to as "pre-rendering") take place without the need for user interaction.

Web page 100 is then displayed 606, including advanced content item 101 that is currently in focus. For advanced content item(s) 101 not currently in focus but visible on the screen, browser 201 depicts static representation(s) ("placeholder(s)") based on the initial rendering.

If the user closes browser 201 or exits 607 web page 100 (for example, by moving to another web page), the method ends 699.

If a change in focus takes place 608, for example in response to the user clicking on a different area of web page 100, the system suspends 609 the plug-in instance for the advanced content item 101 that was previously in focus. The system activates 610 the plug-in instance for the advanced content item 101 that is now in focus, and returns to step 606 to continue displaying web page 100. The advanced content item 101 that was previously in focus is now replaced by a static image.

As described above, in some embodiments, suspended instance(s) may continue to run, but at a slower frame rate than normal. In such an embodiment, advanced content item(s) 101 not currently in focus may still be updated at the slower frame rate, while the advanced content item 101 currently in focus behaves normally.

Visual Appearance

Referring now to FIGS. 4A through 4D, there are shown screen shots depicting examples of the operation of the present invention according to one embodiment. One skilled in the art will recognize that these screen shots are merely exemplary, and that other arrangements and visual indicators can be used without departing from the essential characteristics of the invention.

Figure 4A:
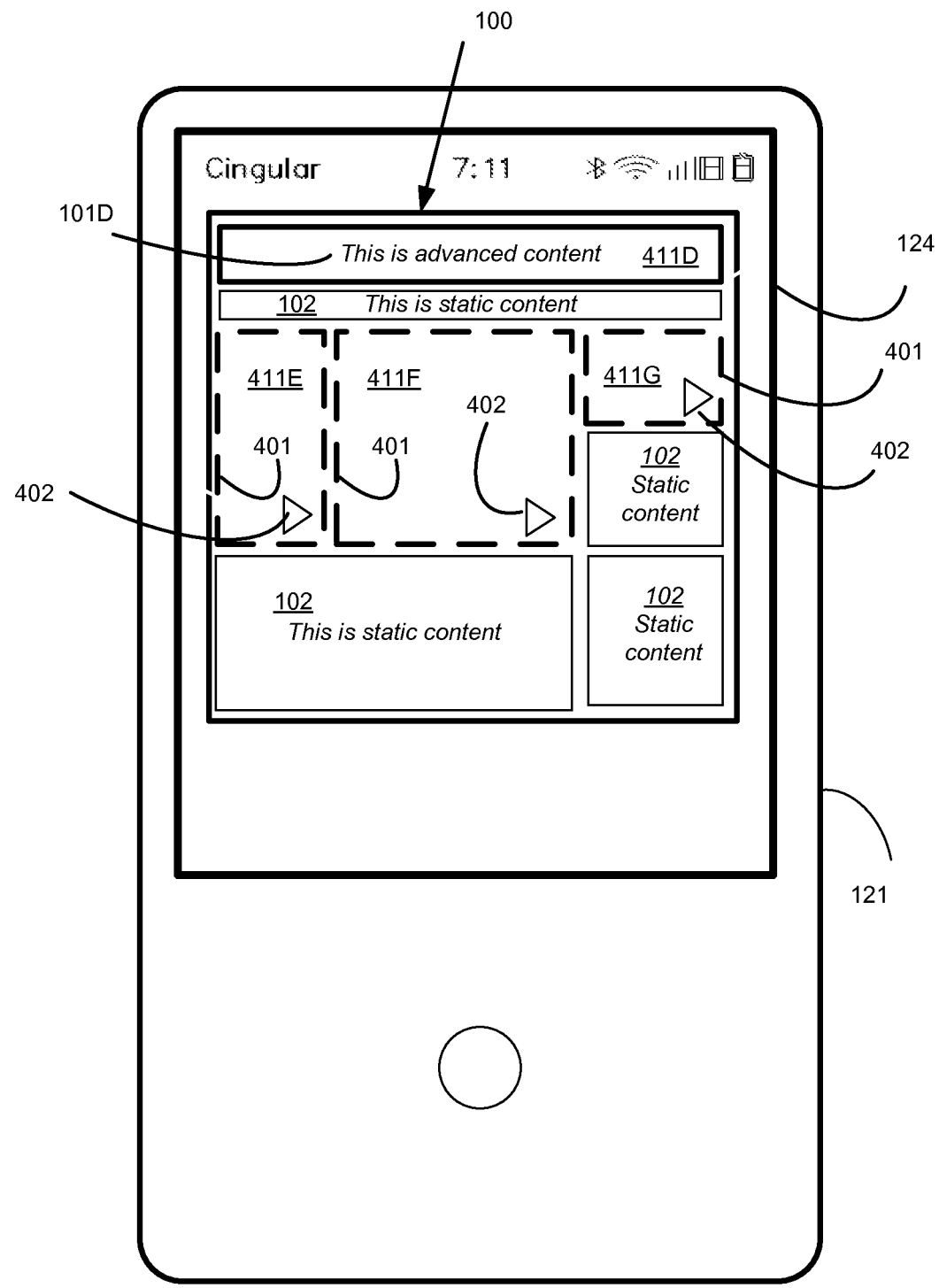
FIGS. 4A through 4D are screen shots depicting examples of the operation of the present invention according to one embodiment.

In the example of FIG. 4A, web page 100 includes four areas 411D, 411E, 411F, 411G for displaying advanced content items 101. Four static content areas 102 are also included. In the example, only one advanced content area 411D contains an active instance that is running advanced content 101D. This area 411D is referred to as having focus. Remaining advanced content areas 411E, 411F, 411G are not currently displaying any advanced content, because their instances have been suspended. A distinctive border 401 is shown for advanced content areas 411E, 411F, 411G corresponding to suspended instances, to indicate the suspended state. In FIG. 4A, this border 401 is shown as a dashed line; however, in various embodiments, border 401 can be shown as a solid line having a distinctive color, such as green, or any other visual indicator can be used to show a suspended state. In other embodiments, no visual indicator is presented. In one embodiment, an advanced content area 411D that contains an active instance has no distinctive visual indicator, because it is animating or playing. Accordingly, in one embodiment, a web page 100 having a single advanced content area 411 would be presented in substantially the same manner as it would be on a conventional desktop PC browser having sufficient resources to run all plug-ins.

In the example, play icons 402 (resembling triangles) are included within advanced content areas 411E, 411F, 411G corresponding to suspended instances. The user can click on a play icon 402 to change focus and thereby cause the corresponding plug-in instance to be activated so as to display the advanced content item 101 for that advanced content area 411. In other embodiments, other icons can be presented; alternatively, no icon need be presented, and the user can simply click within an advanced content area 411 to cause the corresponding plug-in instance to be activated. In other embodiments, a pause or stop icon (not shown) can be presented when an advanced content item 101 is being presented; clicking on this icon causes the advanced content item 101 to be suspended and/or destroyed.

Figure 4B:
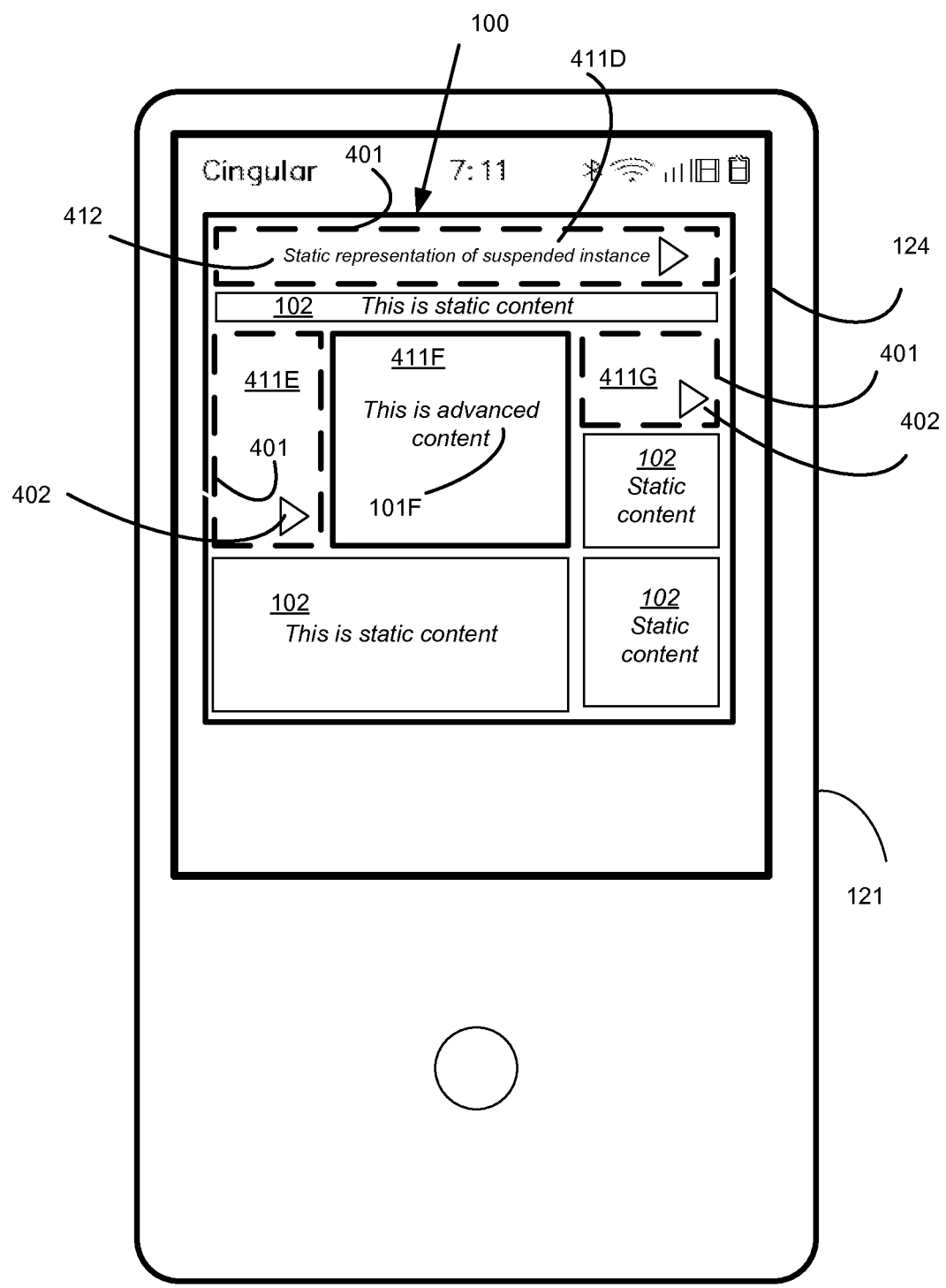

In the example of FIG. 4B, the user has clicked on icon 402 for advanced content area 411F, causing the plug-in instance corresponding to advanced content item 101F to be activated. Advanced content area 411F no longer has a distinctive border, since its content is now active. However, advanced content area 411D that was formerly in focus now has distinctive border 401 to indicate that its plug-in has been suspended. In this example, the active content previously shown in area 411D has been replaced by a static representation 412 (placeholder) depicting the suspended instance in its latest state before suspension. Play icon 402 has also been added to area 411D, to allow the user to reactivate the plug-in instance.

Figure 4C:
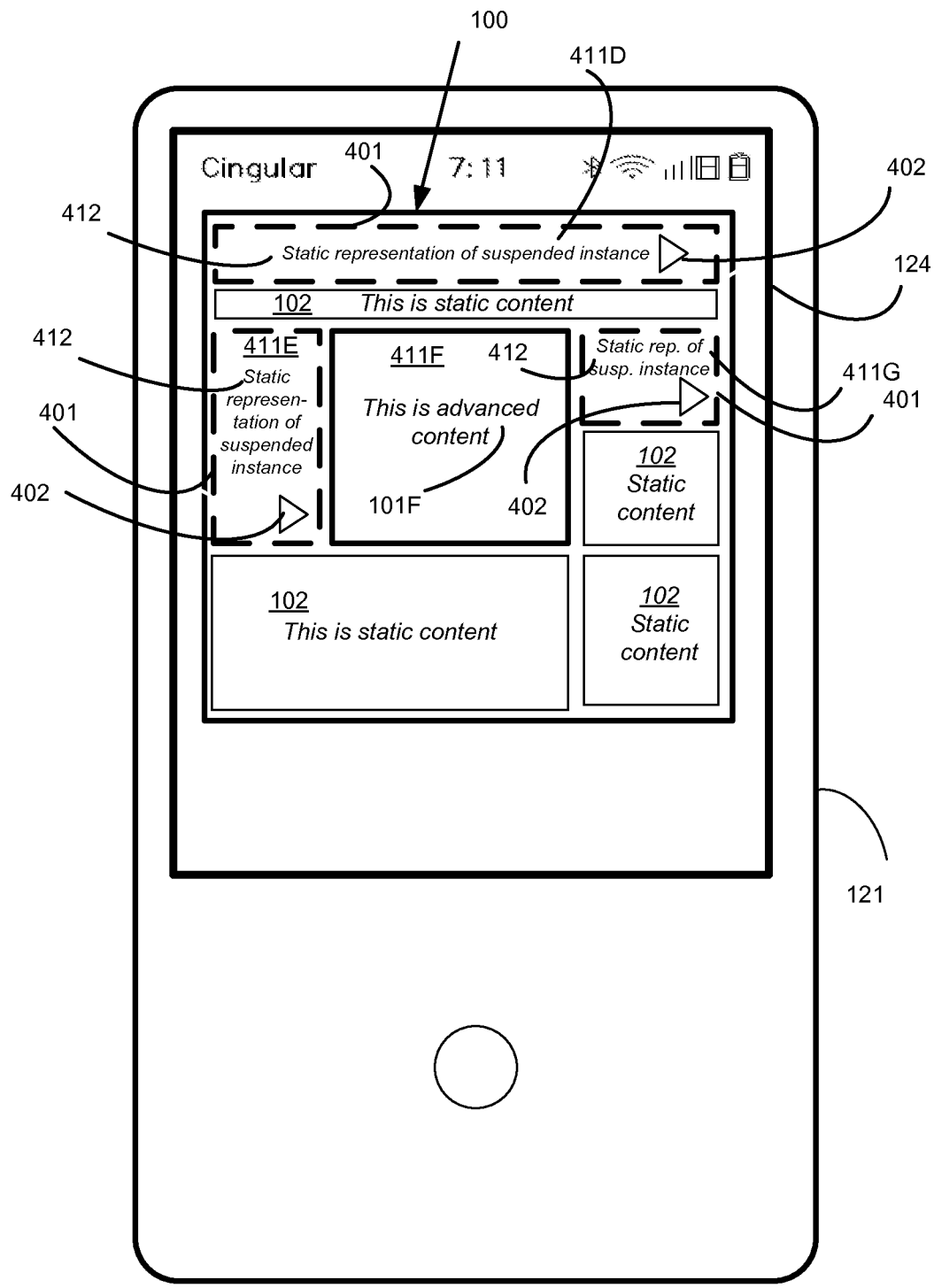

In the example of FIG. 4C, static representations 412 are shown in advanced content areas 411D, 411E, and 411G, while advanced content 101F is shown in area 411F. This may be shown, for example, after the user has successively clicked on advanced content areas 411D, 411E, 411G, and finally 411F, causing each of areas 411D, 411E, 411G to be activated and suspended in turn, with static representations 412 being shown in each. The last advanced content area 411F to be activated runs active advanced content 101F.

Alternatively, a configuration such as that shown in FIG. 4C can result from the preloading technique described above in connection with FIG. 6. Advanced content area 411F is given focus. For the other advanced content areas 411D, 411E, and 411G, plug-in instances are instantiated and activated, until a representative frame is generated for each. These instances are then suspended, and the representative frames are presented as static representations 412 of the suspended instances. Distinctive borders 401 and play icons 402 are included for suspended instances.

Figure 4D:
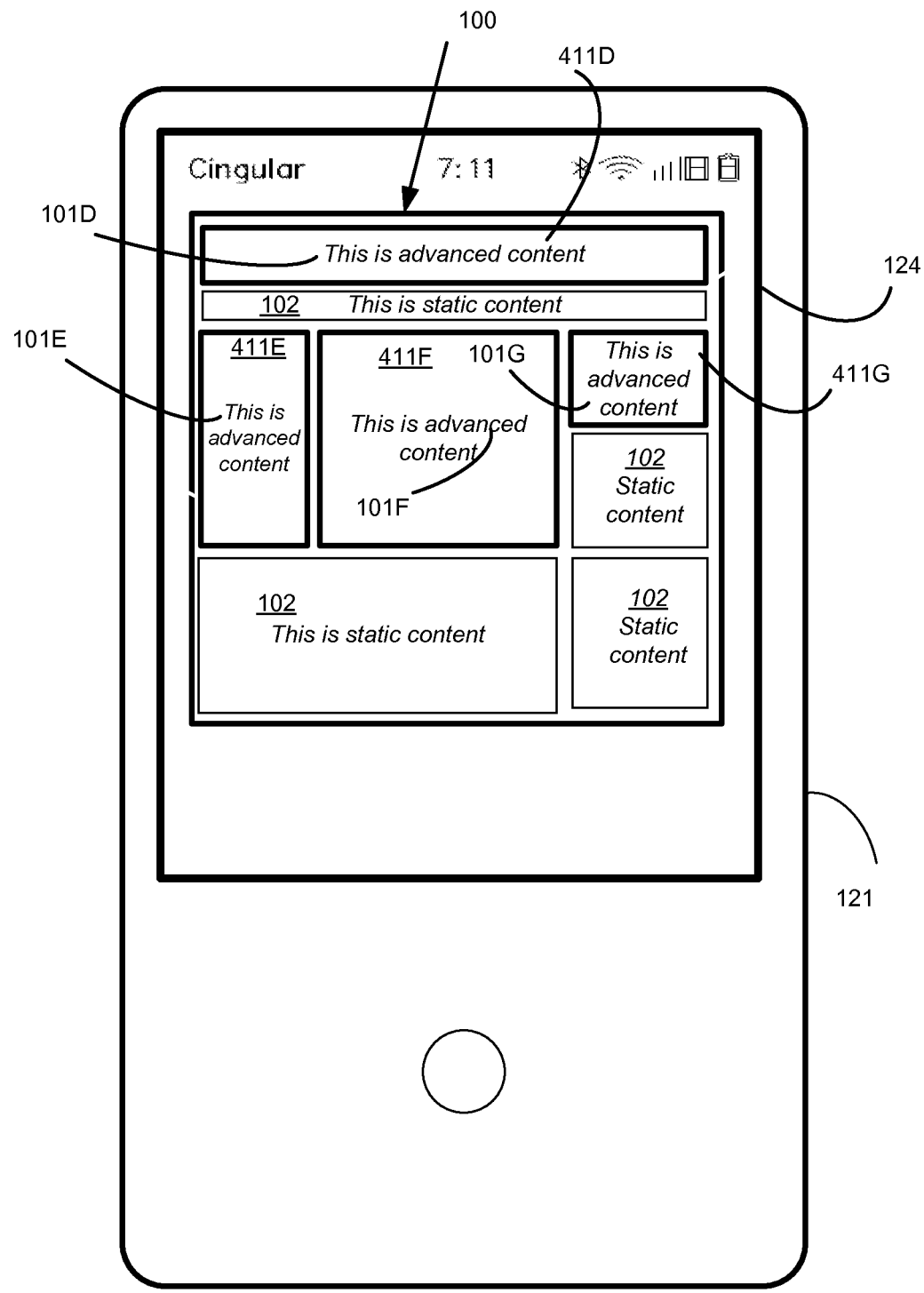

In the example of FIG. 4D, advanced content items 101 are displayed in all four advanced content areas 411D, 411E, 411F, 411G. This may take place, for example, if it determined that sufficient system resources are available to permit activation plug-in instances for all on-screen advanced content areas 411. Accordingly, no static representations need be presented, and no distinctive borders 401 or play icons 402 are presented. In some embodiments, icons or commands may be available to permit the user to cause particular instances to be suspended.

State Transitions for Instances

In one embodiment, instances change state under the direction of instance manager 209. A variable called SetInstanceState represents the single instance state-machine, and keeps track of the current state of each instance.

Figure 5:
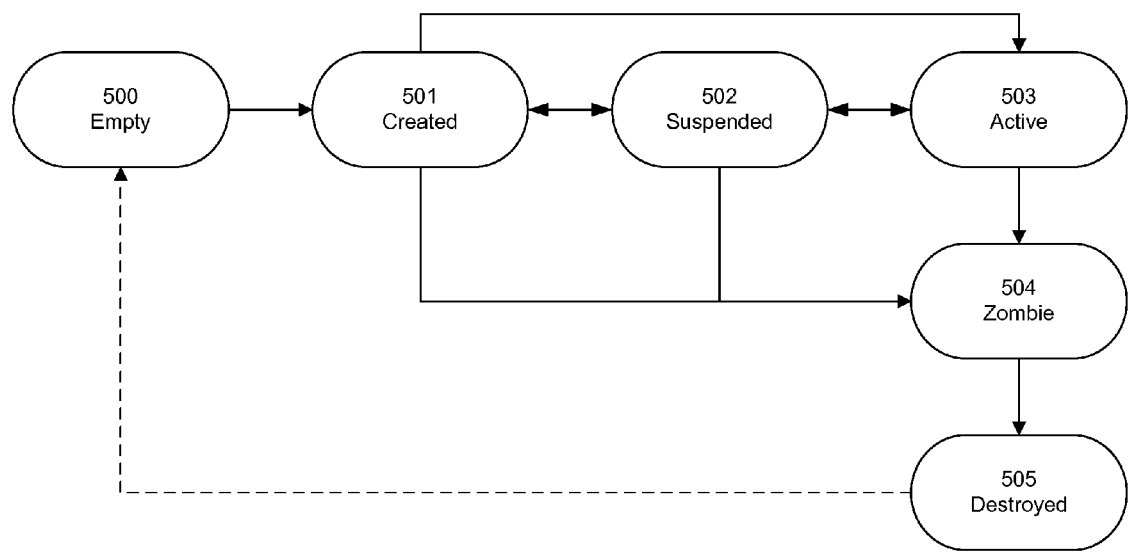
FIG. 5 is a state diagram depicting various states for a plug-in and further depicting transitions from one state to another in accordance with an embodiment of the present invention.

Referring now to FIG. 5, there is shown an example of a state diagram depicting various states for a plug-in and further depicting transitions from one state to another in accordance with an embodiment of the present invention.

Empty state 500 (SetInstanceState=InstanceEmpty): The data structure or object for the instance has been created and can be added to the list of instances, but no parameters or instance variables have been filled yet. Loading of parameters causes a transition to created state 501.

Created state 501 (SetInstanceState=InstanceCreated): The instance now has a URL, linked to the plug-in file (such as a Shockwave file) to load, width, height, and other parameters. It starts the periodic loop to "do something". Hidden instances remain in this state until they are going to zombie state 504 or destroyed state 505. Activation causes a transition to active state 503. Release of variables causes a transition to zombie state 504 and/or destroyed state 505. Suspension causes a transition to suspended state 502.

Suspended state 502 (SetInstanceState=InstanceSuspended): The instance has a full area copy of what it looked like before it suspended. The instance's periodic loop has gone to a low refresh rate (or to no refreshes at all), but is otherwise ready to resume at any time. In one embodiment, if the full area copy is rescaled or invalidated, the instance returns to created state 501. Activation causes a transition to active state 503. Release of variables causes a transition to zombie state 504 and/or destroyed state 505.

Active state 503 (SetInstanceState=InstanceActive): The instance is fully loaded and goes through a periodic loop of animation, audio and/or video. Bad or invalid content can cause a transition to zombie state 504. Suspension causes a transition to suspended state 502.

Zombie state 504 (SetInstanceState=InstanceZombie): This state is used, for example, when bad or invalid content is detected, or when an instance crashes. The instance does not run the content or animate, but may maintain a static copy of its appearance from the last time it rendered, or may be assigned an appearance like a broken icon. It can respond to redraw requests when valid content is received. A pointer to content can be retained, while the content itself can be deleted. Any memory-consuming variables are released. A visual indication, such as a distinctive red border or "crash" icon can be presented, without running any dynamic content. In one embodiment, the system may attempt to restart the crashed instance, or a "restart" icon can be presented to allow the user to initiate an attempt at restarting the instance. If the user leaves web page 100, the instance transitions to destroyed state 505. Clearing and releasing of all variables (for example if web page 100 is reloaded) also results in a transition to destroyed state 505.

Destroyed state 505 (SetInstanceState=InstanceDestroyed): The instance variables are all cleared and released. Destroyed state 505 is, in one embodiment, effectively identical to empty state 500. Upon recycling, the state changes to created state 501. If the instance is not recycled, it is removed from the instance list and the data structure or object is freed.

The term "loaded" can refer to any instance that is in a created state 501, suspended state 502, active state 503, or zombie state 504.

In some embodiments, plug-in instances can be recycled. Such recycling can be performed for ease of programming, as well as to save CPU cycles and lower memory fragmentation. Recycled instances are not taken out of the linked list but are given a new URL, dimensions, and/or related parameters as appropriate. The dotted line from destroyed state 505 to empty state 500 indicates this option.

One skilled in the art will recognize that the state descriptions are exemplary, and that the invention can be implemented with other states, descriptions, and arrangements.

In one embodiment, instance manager 209 ensures that the number of instances in any given state at any given time does not exceed a predetermined maximum. This maximum may be specified, for example, so as to avoid over-loading of system resources such as memory, processing power, and/or network bandwidth. Some examples of specified maximums include:

maximum number of loaded plug-ins;
maximum number of active plug-ins;
maximum number of active instances.

In addition, instance manager 509 can also impose a total memory budget (specified as a quantity of memory), so that plug-ins that would exceed the budget are prevented from loading and/or activating instances.

In addition, instance manager 509 can also impose a limit on the number of plug-in instances that are permitted to occupy the entire screen or window. Such a limit may be 1 in most cases, since no other plug-in instances would be visible if one were occupying the entire screen or window. Any other plug-in instances would be suspended when one plug-in instance occupies the entire screen or window.

The various features described above can be implemented singly or in any combination, as will be apparent to one skilled in the art.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, consumer electronic device, television, set-top box, or the like. An electronic device for implementing the present invention may use an operating system such as, for example, webOS available from Palm, Inc. of Sunnyvale, Calif., or Microsoft Windows 7 available from Microsoft Corporation of Redmond, Wash., or any other operating system that is adapted for use on the device. In some embodiments, the electronic device for implementing the present invention includes functionality for communication over one or more networks, including for example a cellular telephone network, wireless network, and/or computer network such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for selectively activating advanced content items on a computing device comprising:
    determining one or more prioritization rules that control which plug-ins to use to load and activate advanced content items for display on the computing device;
    receiving a plurality of advanced content items as part of a presentation, the presentation to be displayed on a display of the computing device;
    determining that computing resources of the computing device are insufficient to load and activate a designated number of the plurality of advanced content items for presentation;
    based on the one or more prioritization rules, (i) selecting one or more plug-ins used to render one or more of the plurality of advanced content items to be loaded into memory, and (ii) loading the selected one or more plug-ins into memory;
    based on the one or more prioritization rules, selecting at least one of the plurality of advanced content items for activation;
    instantiating at least one instance of the loaded one or more plug-ins for the selected at least one advanced content item;
    activating the at least one instance; and
    displaying output generated by the at least one activated instance on the display as part of the presentation, the output corresponding the selected at least one advanced content item.

2. The method of claim 1, further comprising:
    displaying placeholder output for non-selected advanced content items.

3. The method of claim 2, wherein displaying placeholder output for non-selected advanced content items comprises, for each non-selected advanced content item: displaying a static image representative of the non-selected advanced content item.

4. The method of claim 3, wherein displaying a static image representative of the non-selected advanced content item comprises:
    instantiating an instance of the loaded one or more plug-ins for the non-selected advanced content item;
    activating the instance for the non-selected advanced content item;
    capturing a static image from generated output of the activated instance for the non-selected advanced content item;
    suspending the instance for the non-selected advanced content item; and
    displaying the captured static image.

5. The method of claim 1, further comprising, for each of some of non-selected advanced content items:
    instantiating an instance of the loaded one or more plug-ins for the non-selected advanced content item;
    activating the instance for the non-selected advanced content item at a reduced frame rate with respect to the frame rate for selected advanced content items; and
    displaying output generated by the activated instance for the non-selected advanced content item at the reduced frame rate.

6. The method of claim 1, wherein the one or more prioritization rules is based on available computing resources of the computing device.

7. The method of claim 1, wherein the one or more prioritization rules is based at least in part on:
    total memory usage available to be used by advanced content items;
    total number of advanced content item code entities to be loaded into memory;
    total number of advanced content items to be activated;
    available processor bandwidth;
    available network bandwidth; or
    available space on the display.

8. The method of claim 1, further comprising:
    in response to instantiating the at least one instance, adding the at least one instance to an instance list, the instance list maintaining which plug-ins are currently loaded and how many instances of the loaded plug-ins are currently running.

9. The method of claim 1, wherein receiving a plurality of advanced content items comprises receiving a web page to be displayed on the display, the web page comprising a plurality of advanced content items.

10. The method of claim 1, further comprising:
    detecting a trigger event; and
    in response to detecting the trigger event:
    changing the one or more prioritization rules; and
    in accordance with the change, performing at least one of:
        suspending the at least one activated instance;
        loading additional plug-ins into memory that have not yet been loaded; or
        instantiating and activating at least one additional instance of the loaded one or more plug-ins.

11. The method of claim 10, wherein suspending the at least one activated instance comprises saving a state of the at least one activated instance.

12. The method of claim 11, wherein suspending the at least one activated instance comprises displaying a static representation of the at least one activated instance.

13. The method of claim 10, wherein detecting a trigger event comprises detecting user input for selecting an advanced content item that has not been rendered by the loaded one or more plug-ins.

14. The method of claim 10, wherein detecting a trigger event comprises detecting user input for scrolling of the presentation so that the at least one advanced content item is moved from an on-screen location of the display to an off-screen location.

15. The method of claim 10, wherein detecting a trigger event comprises detecting user input for scrolling of the presentation so that an advanced content item that has not been rendered by the loaded one or more plug-ins is moved from an off-screen location of the display to an on-screen location.

16. The method of claim 10, wherein detecting a trigger event comprises detecting a change in focus.

17. A computer program product for selectively activating advanced content items on a computing device comprising:
a non-transitory computer-readable storage medium; and
computer program code, encoded on the medium, for causing a processor to perform the steps of:
determining one or more prioritization rules that control which plug-ins to use to load and activate advanced content items for display on the computing device;
receiving a plurality of advanced content items as part of a presentation, the presentation to be displayed on a display of the computing device;
determining that computing resources of the computing device are insufficient to load and activate a designated number of the plurality of advanced content items for presentation;
based on the one or more prioritization rules, (i) selecting one or more plug-ins used to render one or more of advanced content items to be loaded into memory, and (ii) loading the selected one or more plug-ins into memory;
based on the one or more prioritization rules, selecting at least one of the plurality of advanced content items for activation;
instantiating at least one instance of the loaded one or more plug-ins for the selected at least one advanced content item;
activating the at least one instance; and
displaying output generated by the at least one activated instance on the display as part of the presentation, the output corresponding the selected at least one advanced content item.

18. The computer program product of claim 17, wherein the one or more prioritization rules is based on available computing resources of the computing device.

19. The computer program product of claim 17, wherein the one or more prioritization rules is based at least in part on:
total memory usage available to be used by advanced content items;
total number of advanced content item code entities to be loaded into memory;
total number of advanced content items to be activated;
available processor bandwidth;
available network bandwidth; or
available space on the display.

20. The computer program product of claim 17, wherein the computer program code causes the processor to:
in response to instantiating the at least one instance, add the at least one instance to an instance list, the instance list maintaining which plug-ins are currently loaded and how many instances of the loaded plug-ins are currently running.

21. The computer program product of claim 17, wherein the computer program code causes the processor to, for each of some of non-selected advanced content items:
instantiate an instance of the loaded one or more plug-ins for the non-selected advanced content item;
activate the instance for the non-selected advanced content item at a reduced frame rate with respect to the frame rate for selected advanced content items; and
display output generated by the activated instance for the non-selected advanced content item at the reduced frame rate.

22. The computer program product of claim 17, wherein the computer program code causes the processor to:
detect a trigger event; and
in response to detecting the trigger event:
change the one or more prioritization rules; and
in accordance with the change, perform at least one of:
suspend the at least one activated instance;
loading additional plug-ins into memory that have not yet been loaded; and
instantiating and activating at least one additional instance of the loaded one or more plug-ins.

23. A system for selectively activating advanced content items on a computing device comprising:
a display;
memory resources; and
processing resources coupled to the display and the memory resources to implement:
a browser to receive a plurality of advanced content items as part of a presentation, the presentation to be displayed on the display;
an instance manager, operatively coupled to the browser, for:
determining one or more prioritization rules that control which plug-ins to use to load and activate advanced content items for display on the computing device;
determining that computing resources of the computing device are insufficient to load and activate a designated number of the plurality of advanced content items for presentation;
based on the one or more prioritization rules, (i) selecting one or more plug-ins used to render one or more of the plurality of advanced content items to be loaded into the memory resources, (ii) causing the selected one or more plug-ins to be loaded into the memory resources;
based on the one or more prioritization rules, selecting at least one of the plurality of advanced content items for activation;
causing at least one instance of the loaded one or more plug-ins for the selected at least one advanced content item to be instantiated;
causing the at least one instance to be activated so that the browser can display output generated by the at least one activated instance on the display as part of the presentation, the output corresponding the selected at least one advanced content item.

24. The system of claim 23, wherein a the one or more prioritization rules is based on available computing resources of the computing device.

25. The system of claim 23, wherein the one or more prioritization rules is based at least in part on:
total memory usage available to be used by advanced content items;
total number of advanced content item code entities to be loaded into memory;
total number of advanced content items to be activated;
available processor bandwidth;
available network bandwidth; or
available space on the display.

26. The system of claim 23, wherein the instance manager:
in response to instantiating the at least one instance, adds the at least one instance to an instance list, the instance list maintaining which plug-ins are currently loaded and how many instances of the loaded plug-ins are currently running.

27. The system of claim 23, wherein the instance manager:
  detects a trigger event; and
  in response to detecting the trigger event:
    changes the one or more prioritization rules; and
    in accordance with the change, performs at least one of:
      causing the at least one activated instance to be suspended;
      causing additional plug-ins that have not yet been loaded to be loaded into the memory resources; and
      causing at least one additional instance of the loaded one or more plug-ins to be instantiated and activated.

* * * * *

UNITED STATES PATENT AND TRADEMARK OFFICE
CERTIFICATE OF CORRECTION

PATENT NO. : 8,448,090 B2
APPLICATION NO. : 12/690106
DATED : May 21, 2013
INVENTOR(S) : Pieter van der Meulen et al.

It is certified that error appears in the above-identified patent and that said Letters Patent is hereby corrected as shown below:

In the Claims:

In column 22, line 49, in Claim 24, delete "a the" and insert -- the --, therefor.

Signed and Sealed this
Twentieth Day of August, 2013

Teresa Stanek Rea
*Acting Director of the United States Patent and Trademark Office*